United States Patent [19]
Spencer et al.

[11] Patent Number: 5,941,432
[45] Date of Patent: *Aug. 24, 1999

[54] STORAGE CONTAINER FOR EMERGENCY FUEL

[75] Inventors: Reginald N. Spencer, Baltimore; William A. Hubbard, Timonium, both of Md.

[73] Assignee: Maryland Patent Holdings, LLC, Towson, Md.; a part interest

[ * ] Notice: This patent issued on a continued prosecution application filed under 37 CFR 1.53(d), and is subject to the twenty year patent term provisions of 35 U.S.C. 154(a)(2).

[21] Appl. No.: 08/964,358

[22] Filed: Nov. 4, 1997

[51] Int. Cl.$^6$ ...................................................... B62D 43/00
[52] U.S. Cl. .................. 224/42.13; 224/42.2; 224/42.14; 206/304; 220/23.87; 222/523; 141/2
[58] Field of Search ............................... 224/42.2, 42.13, 224/42.14; 220/4.13, 23.83, 23.87, 23.89; 206/304, 216; 222/153.07, 78, 523, 527, 147; 141/2

[56] References Cited

U.S. PATENT DOCUMENTS

| | | | |
|---|---|---|---|
| 2,049,900 | 8/1936 | Evans et al. | 222/523 |
| 2,660,348 | 11/1953 | Muller | 224/42.14 |
| 4,784,296 | 11/1988 | Bullock | 222/153.07 |
| 5,447,110 | 9/1995 | Brown | 224/42.14 |
| 5,681,358 | 10/1997 | Spencer et al. | 44/300 |

*Primary Examiner*—Henry J. Recla
*Assistant Examiner*—Tuan Nguyen
*Attorney, Agent, or Firm*—Leonard Bloom

[57] ABSTRACT

The combination of a container having an emergency fuel therein for an internal combustion engine. The container is disposed in a trunk of a vehicle or in a storage compartment on a boat. A handle is formed on a body of the container. A closable outlet is formed on the body. A spout is adapted to be connected to the closable outlet. The container is manually releasably retained in the trunk of the vehicle. Also a method is disclosed of safely storing a stable emergency fuel in the trunk of a vehicle or in a storage compartment on a boat.

2 Claims, 6 Drawing Sheets

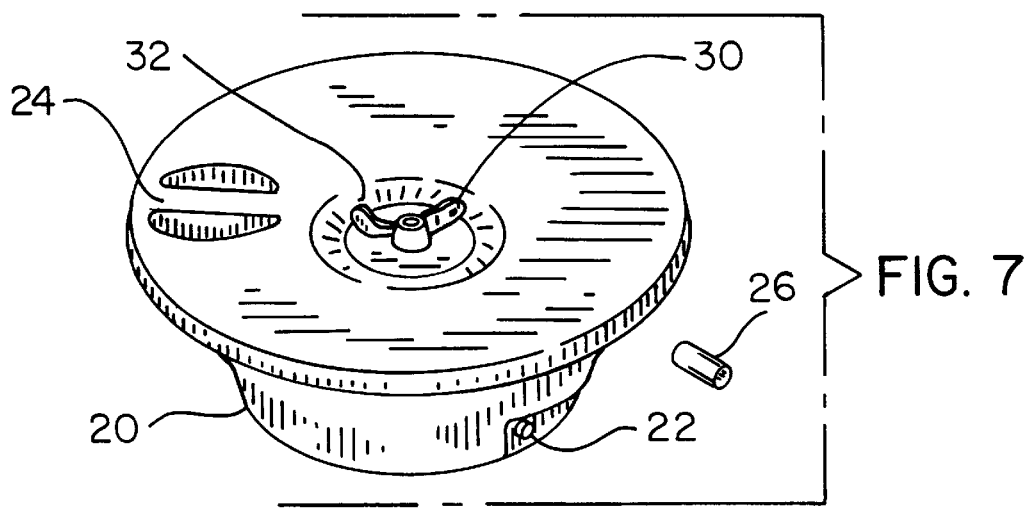
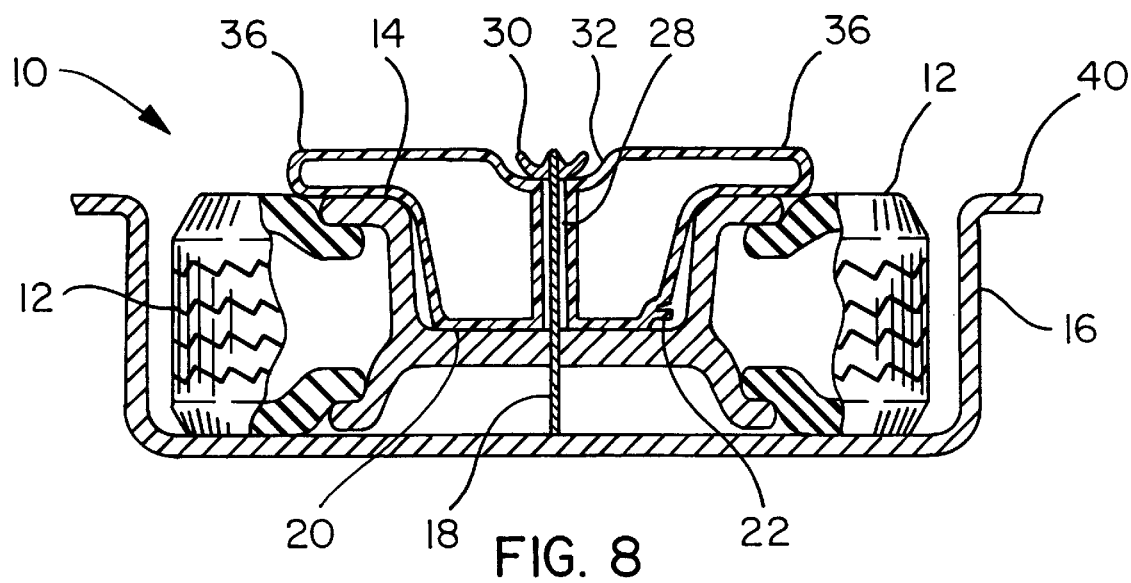
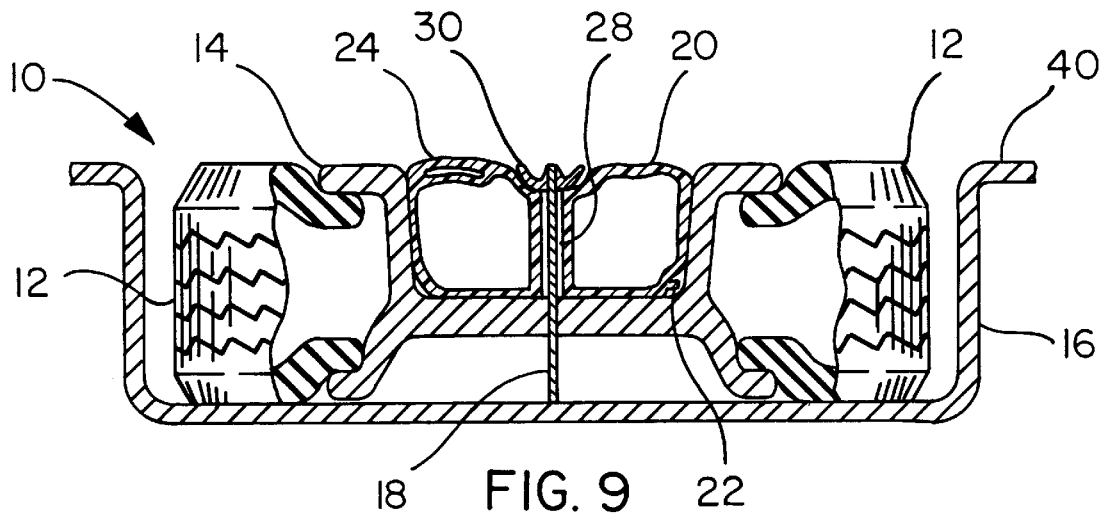

STORAGE CONTAINER FOR EMERGENCY FUEL

BACKGROUND OF THE INVENTION

This invention is a storage container for motor fuel which can be safely stored for long periods in a conveyance for use in the emergency situation when the regular fuel supply is depleted.

The problem of "running out of gas" is as old as the use of gasoline in powering vehicles such as automobiles and boats. It has been a long-existing problem and here-to-fore no one has come up with a safe and practical answer. The reason this problem has defied solution is that gasoline normally contains some butane and pentane giving the gasoline a flash point of minus 40° to minus 50° F. The butane and pentane are necessary so that a cold motor can be readily started. This means that any spill of gasoline will quickly vaporize to form potentially explosive fumes which can be ignited by a spark or flame. As a result, it is extremely dangerous to store or transport gasoline in a container in a car or other conveyance. Indeed, many states have laws making it illegal to store a container of gasoline in the trunk of an automobile.

In U.S. Pat. No. 5,681,358, the applicants disclose a method of using an emergency fuel in an internal combustion engine. The method includes a container. The present invention is an improvement to provide a shaped container for the fuel to be received in space in the trunk of the vehicle which otherwise is unutilizable or has limited use.

BRIEF SUMMARY OF THE INVENTION

It is an object of the present invention to provide a storage container for a fuel which can be securely stored in the trunk of a vehicle.

It is a further object of the present invention to provide a container which has a spout to reach into the gas inlet to the fuel tank of the vehicle.

It is another object of the present invention to provide a closure to the outlet of the container which renders the container non-reusable when the closure is opened.

It is still another object of the present invention to provide a method of safely storing a container of emergency fuel in the trunk of a vehicle.

In accordance with the teachings of the present invention, there is disclosed the combination of a container having emergency fuel therein for an internal combustion engine, the container being disposed in a trunk of a vehicle. The container has a body having a handle thereon, a closable outlet formed in the body from which the emergency fuel may be poured, a spout means is adapted to be connected to the closable outlet, and manually releasable means for retaining the container in the trunk of the vehicle.

There is further disclosed the combination of a container for emergency fuel to be stored in the wheel well of a vehicle. The container has a body to contain the fuel therein, the body having a handle thereon. A closable outlet is formed in the body from which the emergency fuel may be poured. A spout means is adapted to be connected to the closable outlet. A through opening is formed in the body. The container may be disposed juxtapositioned to a spare wheel in the wheel well. A threaded bolt within the wheel well of the vehicle extends through the through opening in the container such that a nut means may be tightened on the threaded bolt to secure the container and the spare wheel within the wheel well. The nut means may be loosened to remove the container. The closable outlet may be opened to provide access for the spout means such that the container may be picked up by the handle and the emergency fuel in the container may be emptied into a fuel tank of the vehicle.

In another aspect, there is disclosed the method of safely storing a stable emergency fuel in the trunk of a vehicle, wherein the vehicle has a gas tank, and wherein the trunk of the vehicle contains a spare wheel provided with a rim having a well defined by an outer surface. The method includes the steps of providing a container wherein at least a portion of its outer surface is substantially complementary to the outer surface of the well within the rim of the spare wheel in the trunk of the vehicle. The container is filled with a stable emergency fuel having a relatively high flash point, so that the container may be stored safely in the trunk. The container is removably secured to the spare wheel, so that in the event the driver of the vehicle runs out of gas, the trunk may be opened to quickly remove the container, open it, and pour the emergency fluid contained therein into the gas tank of the vehicle.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practice of the invention. Accordingly, the drawings and descriptions will be regarded as illustrative in nature and not as restrictive.

These and other objects of the present invention will become apparent from a reading of the following specification taken in conjunction with the enclosed drawings.

BRIEF DESCRIPTION OF THE DRAWINGS

FIG. 7 is a perspective view of another embodiment of the present invention having a flange portion formed on the body.

FIG. 8 is a cross-sectional view showing the embodiment of FIG. 7 disposed in the rim of the spare wheel of FIG. 1.

FIG. 9 is a cross-sectional view of an embodiment of the container, wherein the body is flexible and is received in the rim of the spare wheel.

DESCRIPTION

Figure 1:
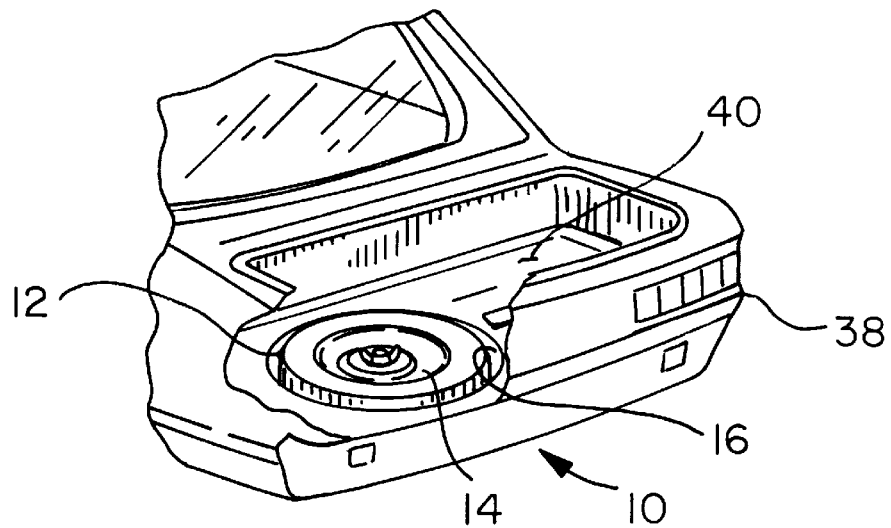
FIG. 1 is a perspective view of the opened trunk of a typical vehicle showing the wheel well in which the spare wheel is stored.
Figure 2:
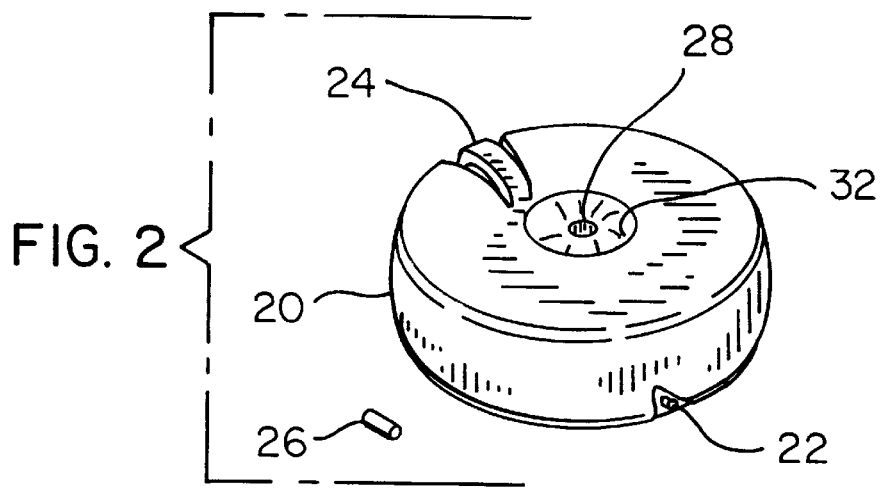
FIG. 2 is a perspective view of a substantially toroidally-shaped embodiment of the emergency fuel container of the present invention showing the closable outlet, handle and through opening.

Referring now to the drawings, FIG. 1 shows the opened trunk of a typical motor vehicle with the spare wheel 10 consisting of the spare tire 12 mounted on a rim 14. The spare wheel 10 is disposed in a wheel well 16 formed in the deck 40 of the trunk and is retained therein by a threaded bolt 18 which is connected to the deck of the trunk in the bottom of the wheel well. The threaded bolt 18 extends upwardly through an opening in the rim 14 and a threaded nut, generally a winged nut, is cooperatively threaded onto the threaded bolt 18 and tightened to securely retain the spare wheel 10 within the wheel well 16.

Figure 3:
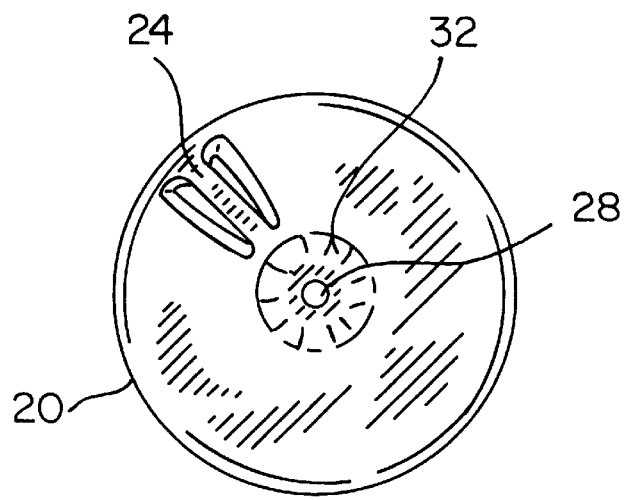
FIG. 3 is a top plan view of the embodiment of FIG. 2.
Figure 4:
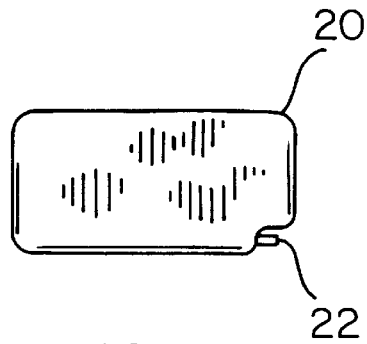
FIG. 4 is a side elevation view of the embodiment of FIG. 2.
Figure 5:
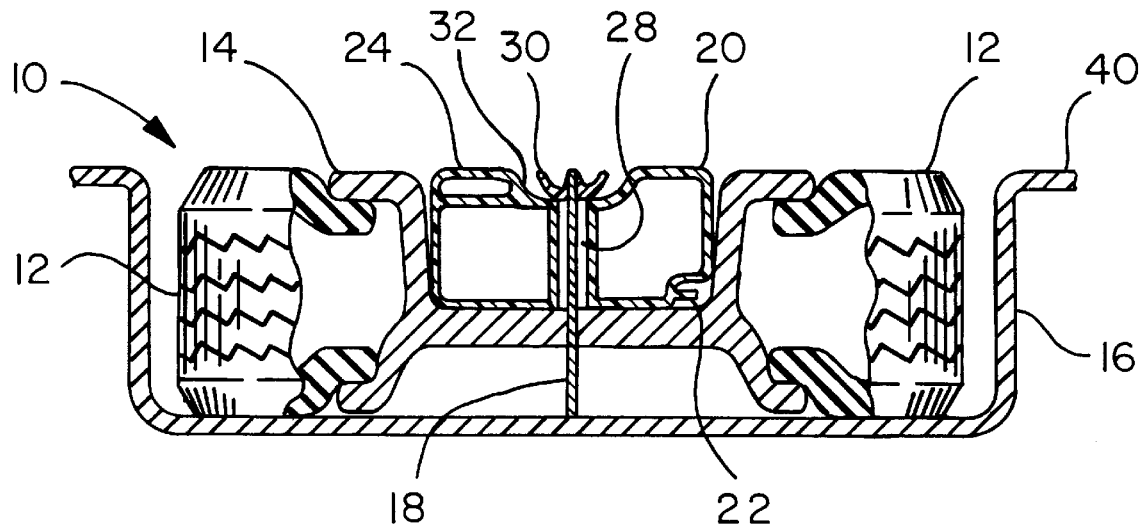
FIG. 5 is a cross-sectional view of the embodiment of FIG. 1 disposed in the rim of the spare wheel of FIG. 1.

As shown in FIGS. 3–5, one embodiment of the container of the present invention is a substantially toroidally-shaped body 20 to contain the emergency fuel therein. The emergency fuel has a relatively high flash point, preferably greater than 100° F., so that the emergency fuel is considered by the Department of Transportation to be "combustible" rather than "flammable". The emergency fuel is stable in storage for at least one year. A closable outlet 22 is formed on the doughnut-shaped body 20. Preferably, the closable outlet 22 is located under a shoulder or in a recess in the body so that the outlet 22 is protected from being damaged. Also, it is preferred that the outlet 22 be formed on a sidewall or bottom of the body 22 as will be described. A cap or other removable closure means is fitted to the outlet 22 to positively seal the outlet and prevent leakage or evaporation of the emergency fuel from the container. It is further preferred that when the cap or removable closure is removed from the outlet 22, the outlet cannot be reclosed and the container of the present invention cannot be reused. Various seals and closures are disclosed in the applicants' copending application filed Oct. 22, 1997 (serial no. to be assigned). The purpose of this type of closure is to prevent or discourage the placement of gasoline or similar flammable material in the container which would produce a safety hazard in the vehicle.

The body 20 of the container for storing the emergency fuel preferably has a handle 24 for the user to carry the container and to hold while pouring. Preferably, the handle 24 is an integral portion of the body of the container and is disposed on the top surface of the body for ready access. The handle 24 may be a portion of the container bridging a recess wherein the user's hand is placed in the recess to grasp the bridge portion in the palm of the user's hand. Alternately, the handle 24 may be a pair of opposing depressions on opposite sides of the body 20 of the container wherein the user may place a thumb in one depression and the fingers in the opposing depression to grasp the container. Other handles 24 known to persons skilled in the art may be used. The handle 24 preferably does not protrude from the surface of the container. Also, it is preferred that the handle 24 be diametrically opposite from the outlet 22 so that the emergency fuel may be poured more easily from the container. The handle 24 is preferably on the top of the body and the outlet on the bottom or sidewall for protection of the outlet.

Figure 13:
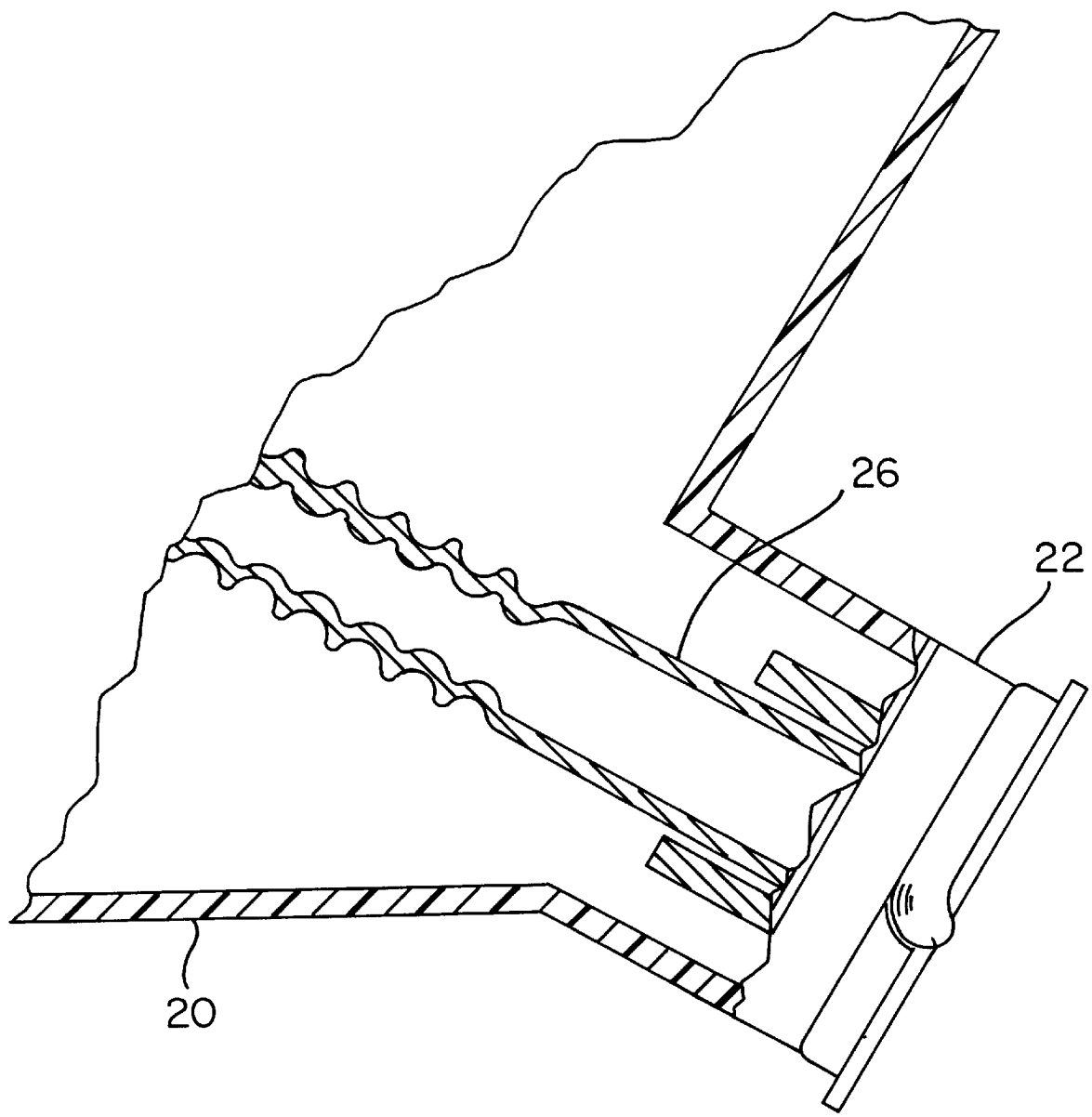
FIG. 13 is a partial cross-sectional view of the container of the present invention showing a sealed outlet and a spout disposed within the container.

A spout means 26 is adapted to be connected to the closable outlet 22. The spout 26 may be theadably connected, connected by friction fit or other means known to persons skilled in the art. The spout 26 is formed to facilitate pouring the emergency fuel from the body 20 of the container. This obviates the need for a long-neck funnel with which to pour the emergency fuel into the fuel tank. Such funnels are hard to find and a nuisance to store. In an emergency situation, it is unlikely that a long-neck funnel would be available. The body 20 of the container may have an integrally formed spout 26 (FIG. 13). The spout 26 has sufficient length to press open the metal shield in the inlet to an automobile gas tank and diameter of the spout 26 is small enough to fit into the lead-free gas tank inlet. The spout 26 may be nested under the body 20 of the container.

The body 20 of the container in the embodiment of FIGS. 3–5 has a through opening 28 formed therein, preferably approximately centrally of the body 20. However, the through opening may be offset from the center and may even be in a tab attached to the body. The exterior of the body 20 is contoured to fit the internal contour within the well in the rim 14 of the spare wheel 10. The threaded bolt 18 is received in the through opening 28 and extends above the top surface of the body 20 of the container. The threaded nut 30, which is preferably a winged nut, is threadingly connected to the threaded bolt 18 and may be manually tightened to secure the container with the emergency fuel together with the spare wheel 10 in the wheel well 16. In this manner, the container is juxtapositioned to the spare wheel 10. The threaded nut 30 may be manually loosened to remove the container having the emergency fuel therein in the event the vehicle runs out of gas.

It is further preferred that the top surface of the body 20 of the container have a recessed portion 32 surrounding the through opening 28. The recessed portion 32 has a diameter greater than the diameter of the wing nut 30 so that the wing nut may be fully rotated within the recessed portion 32. In this manner, the wing nut 30 and the threaded bolt 18 need not extend above the upper surface of the body 20 of the container and any cover or objects placed over the wheel well 16 are free of interference.

Figure 6:
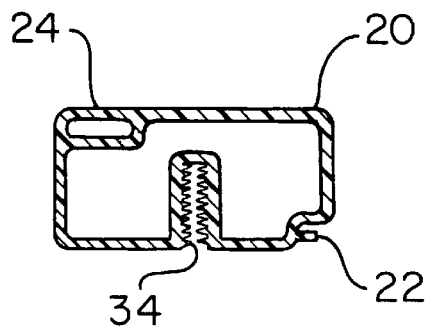
FIG. 6 is a cross-sectional view of an embodiment of the present invention in which a threaded opening is formed in a bottom surface.

Alternately, the body 20 of the container may be formed with a threaded opening 34 in the bottom surface (FIG. 6). The threaded bolt 18 is threadingly received therein. The container is secured and/or removed by rotation of the container about the threaded bolt 18. The container is identical to the first embodiment in all other features.

In another embodiment (FIGS. 7 and 8) a flange portion 36 is formed, preferably circumferentially, on the top surface of the body 20. The flange portion 36 may be hollow to contain the emergency fuel therein or may be solid. The flange portion 36 is supported on the upper surface of the spare tire 12. It is preferred that the diameter of the flange portion 36 be less than the diameter of the spare tire 12 to fit within the wheel well 16. In this embodiment, the body 20 of the container is, in other features, similar to the embodiment of FIGS. 2–6.

It is preferred that the body 20 of the container be molded from a plastic which is compatible with the emergency fuel to avoid deterioration of the body 20 and to prevent contamination of the emergency fuel by dissolving substances from the plastic. Molding also facilitates shaping the contour of the body and forming both the closable outlet 22 and the handle 24 integrally with the body 20.

Figure 14:
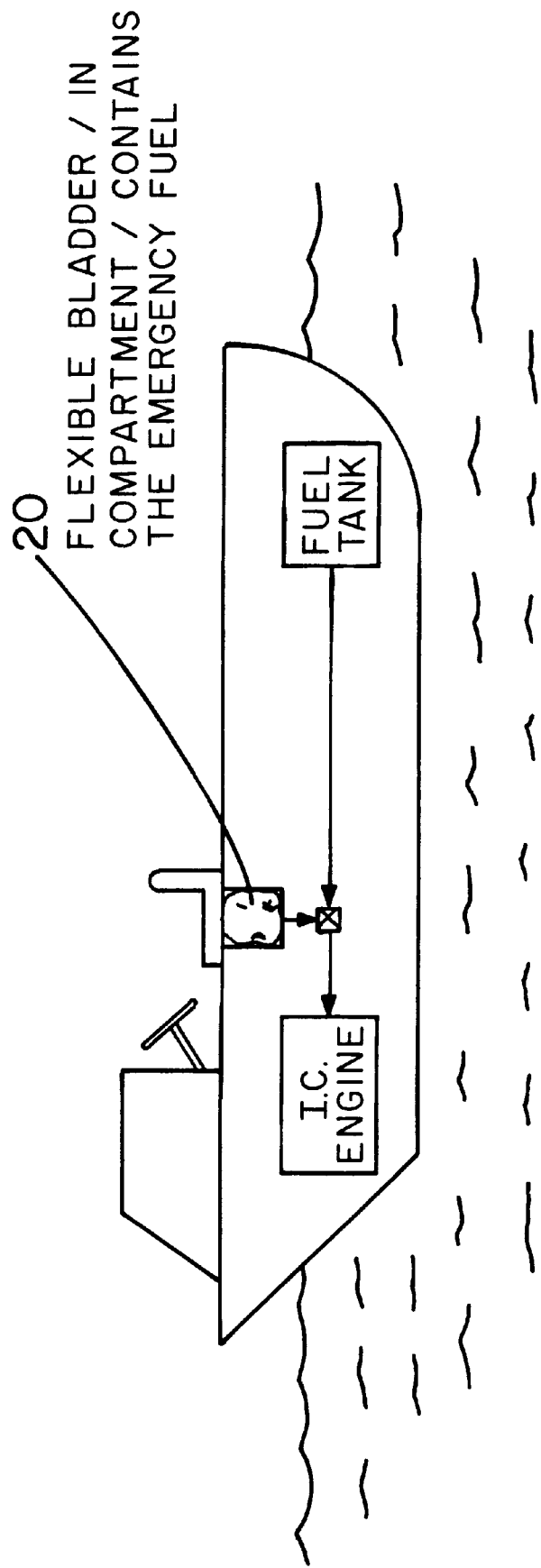
FIG. 14 is a diagram showing the flexible container in a compartment in a boat interconnected with the fuel line in the boat.

Alternately, the body 20 of the container may be flexible and have a bladder-like structure (FIG. 9). In this manner, the body 20 conforms to the internal configuration of the compartment in which it is stored. The body is formed of a material which is compatible with the emergency fuel and which is resistant to tearing and punctures. The flexible body 20 may have a handle 24 and a through opening 28 formed therein so that it may be secured to the spare wheel 10 with a threaded bolt 18 and threaded nut 30 as with the previously described embodiments. For additional rigidity, the body 20 may have supporting ribs formed thereon. On a boat (FIG. 14), the flexible body 20 might be directly connected by tubing to the regular fuel line so that the emergency fuel could be made available to the engine by simply turning a valve. The flexible body would have an opening through which it could be refilled for future use.

Figure 10:
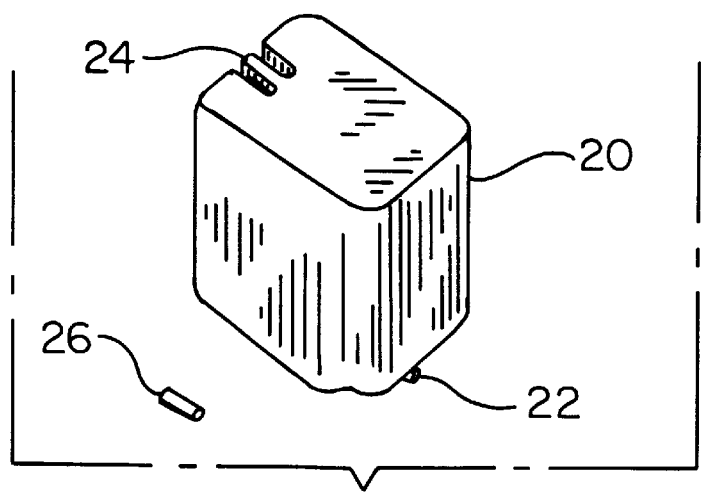
FIG. 10 is a perspective view of an embodiment of the container of the present invention to be received in a well in the trunk of the vehicle.
Figure 11:
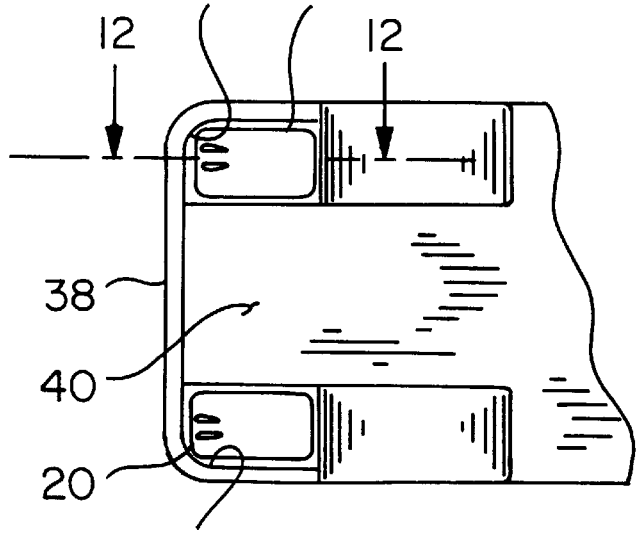
FIG. 11 is a top plan view of the rear section of a vehicle showing the embodiment of FIG. 10 disposed in wells in the floor of the trunk adjacent to the tail lights in the vehicle.
Figure 12:
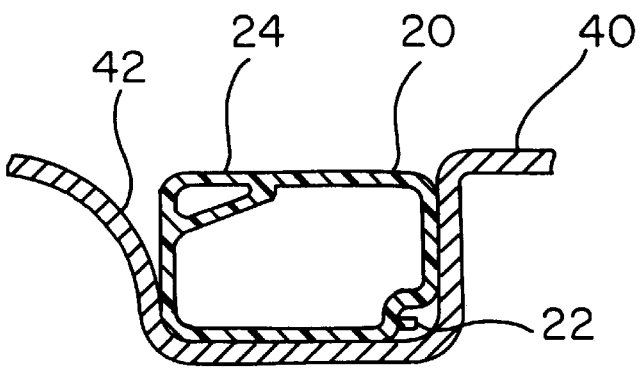
FIG. 12 is a cross-sectional view taken across the lines 12—12 of FIG. 11 showing the container in the well.

In still another embodiment, the container may be formed to be received in an additional well 42 (or wells) formed in the deck 40 of the trunk of the vehicle (FIGS. 10–12). In many vehicles there is formed a well in proximity to the rear of the vehicle 38 between the tail lights and the rear wheels of the vehicle. This well 42 (or wells) may be used to store tools, maps or other items. The body 20 of the container is formed to be received in the additional well 42 preferably by a friction fit. However, a belt or other restraining means may be used to retain the container in the well 42. A handle 24 is formed on the upper surface of the body 20 to permit the user to easily place or remove the container in the additional well 42. The container further has a closable outlet 22 formed on the bottom or sidewall thereof preferably opposite from the handle 24 for use of pouring. The closable outlet 22 is thereby disposed within the additional well 42 and is protected from damage. Also, it is preferred that a spout means 24 be stored within the additional well 42 so that the spout means may be attached to the closable outlet 22 when the emergency fuel is to be poured from the container into the fuel tank of the vehicle. A depression or shoulder may be formed on the bottom surface or sidewall of the body 20 to receive the spout means 26. It is further preferred that the body 20 of the container be fully received in the additional well 42 so that the top surface of the container is substantially flush with the deck 40 of the trunk. This configuration allows full use of the trunk for other purposes and protects the container from damage. However, the container may extend outwardly from the additional well 42 and the present invention is not limited to a flush surface.

In any of the embodiments, the container may have a self-contained spout means 26 (FIG. 13) which is disposed within the body 20 and covered by the cap or removable closure means. After the removable closure and the seal is broken, the spout means 26 is extendable from the outlet 22 and the emergency fuel may be poured from the container into the fuel tank of the vehicle.

The container of the present invention may be formed in various sizes and configurations and if required, may be custom formed for particular vehicles. The volume of emergency fuel contained preferably is approximately one gallon to enable the vehicle to be driven to a source of regular fuel. For boats, the flexible body might contain a much greater volume.

Thus, there is disclosed a container having emergency fuel therein and a method of safely storing an emergency fuel in the trunk of the vehicle or in a compartment on a boat. The container has at least a portion of its outer surface substantially complementary to the outer surface of the well of the rim of a spare wheel which is in the trunk of the vehicle. The container is removably secured to the spare wheel 10 and rim 14 in the trunk. Alternately, the container is secured in a well 42 within the trunk of the vehicle. In the event the vehicle runs out of gas, the driver of the vehicle may open the trunk and quickly remove the container having the emergency fuel, open the container and, using a spout means provided, pour the emergency fuel into the fuel tank of the vehicle to enable the vehicle to be driven to a source of fuel. Alternately, the container may be placed in a compartment within the hull on a boat. The container may be removed and the emergency fuel poured into the boat's fuel tank or the emergency fuel may be connected to the regular fuel line and could be made available by turning a valve.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In combination with a spare wheel in the trunk of a vehicle powered by gasoline, the spare wheel having a rim provided with a central well formed therein, the central well having a given contour, a substantially rigid non-collapsible molded-plastic non-reusable container having an outer contour which is complementary to the given contour of the central well within the rim of the spare wheel, such that the container nests snugly within the well and is retained therein, the container containing an emergency fuel intended to be used if and when the vehicle runs out of gasoline, and the emergency fuel having a relatively high flash point such that the emergency fuel is combustible rather than flammable and may be safely stored in the trunk of the vehicle.

2. The method of using an emergency fuel in an internal combustion engine of a vehicle in the event the vehicle runs out of gasoline, the vehicle including a gas tank and further including a trunk provided with a spare wheel having a well therein, comprising the steps of providing a substantially rigid non-collapsible container which is filled with an emergency fuel having a sufficiently-high flash point for safe storage in the trunk of the vehicle, nesting the filled container within the well of the spare wheel, removing the filled container from the well in the spare wheel of the vehicle, and pouring the emergency fuel into the gas tank of the vehicle.

\* \* \* \* \*